(12) United States Patent
Sleeman et al.

(10) Patent No.: US 6,397,284 B1
(45) Date of Patent: May 28, 2002

(54) APPARATUS AND METHOD FOR HANDLING PERIPHERAL DEVICE INTERRUPTS

(75) Inventors: Peter T Sleeman, Horndean; Richard B Prescott, Bishop's Waltham, both of (GB)

(73) Assignee: Elan Digital Systems Limited (GB)

( * ) Notice: Subject to any disclaimer, the term of this patent is extended or adjusted under 35 U.S.C. 154(b) by 0 days.

(21) Appl. No.: 09/375,428

(22) Filed: Aug. 17, 1999

(30) Foreign Application Priority Data

Mar. 10, 1999 (GB) .............................................. 9905508

(51) Int. Cl.⁷ .............................................. G06F 13/00
(52) U.S. Cl. .................... 710/266; 710/48; 710/301; 710/305; 710/303; 710/315
(58) Field of Search .................... 710/48–51, 260–269, 710/301–304, 305–315; 375/220–222; 713/323–324

(56) References Cited

U.S. PATENT DOCUMENTS

| | | | |
|---|---|---|---|
| 5,191,653 A | * 3/1993 | Banks et al. ................. | 710/113 |
| 5,463,742 A | * 10/1995 | Kobayashi ................... | 710/101 |
| 5,481,678 A | * 1/1996 | Kondo et al. ................ | 710/101 |
| 5,623,674 A | 4/1997 | Pedrizetti et al. | |
| 5,740,452 A | * 4/1998 | Story et al. .................. | 710/261 |
| 5,745,772 A | * 4/1998 | Klein .......................... | 710/266 |
| 5,768,604 A | * 6/1998 | Yamazaki et al. ........... | 713/323 |
| 5,796,981 A | * 8/1998 | Abudayyeh et al. ......... | 395/500 |
| 5,799,064 A | * 8/1998 | Sridhar et al. ............... | 375/222 |
| 5,802,153 A | * 9/1998 | Sridhar et al. ............... | 375/220 |
| 5,805,929 A | * 9/1998 | Connolly et al. ............ | 710/49 |
| 5,812,858 A | * 9/1998 | Nookala et al. ............. | 710/260 |
| 5,881,294 A | * 3/1999 | Downey et al. ............. | 710/260 |
| 5,894,579 A | * 4/1999 | Fujihara ....................... | 713/324 |
| 5,923,887 A | * 7/1999 | Dutton ......................... | 710/260 |
| 5,941,976 A | * 8/1999 | Gulick ......................... | 710/260 |
| 6,044,215 A | * 3/2000 | Charles et al. .......... | 395/500.46 |
| 6,085,279 A | * 7/2000 | Suzuki ......................... | 710/264 |
| 6,101,566 A | * 8/2000 | Woods et al. ............... | 710/129 |
| 6,122,679 A | * 9/2000 | Wunderlich ................. | 710/23 |
| 6,199,134 B1 | * 3/2001 | Deschepper et al. ........ | 710/129 |
| 6,249,834 B1 | * 6/2001 | Henderson et al. ......... | 710/129 |
| 6,275,499 B1 | * 8/2001 | Wynn et al. ................. | 370/438 |

FOREIGN PATENT DOCUMENTS

WO       96/27836       9/1996

* cited by examiner

Primary Examiner—Christopher B. Shin
(74) Attorney, Agent, or Firm—Eric B. Meyertons; Conley, Rose & Tayon, P.C.

(57) ABSTRACT

A computer system having a PCI expansion connector and further including: an operating system operable to detect a PCI-to-PCMCIA bridge on the PCI expansion connector and in response thereto to allocate a legacy interrupt channel for interrupts originating from the PCI-to-PCMCIA bridge, and also operable to detect connection of a PCMCIA card to the PCI-to-PCMCIA bridge and in response thereto to allocate a further legacy interrupt channel for interrupts originating from the PCMCIA card; and a device driver for a PCI-to-PCMCIA bridge, the device driver including a trap mechanism operable to intercept PCI interrupts received through the PCI expansion connector and, in response to interception of a PCI interrupt, to call an interrupt management routine operable to determine that one of said legacy interrupt channel and said further legacy interrupt channel associated with the intercepted PCI interrupt and to call an interrupt service routine using the determined legacy interrupt channel as an operand.

28 Claims, 9 Drawing Sheets

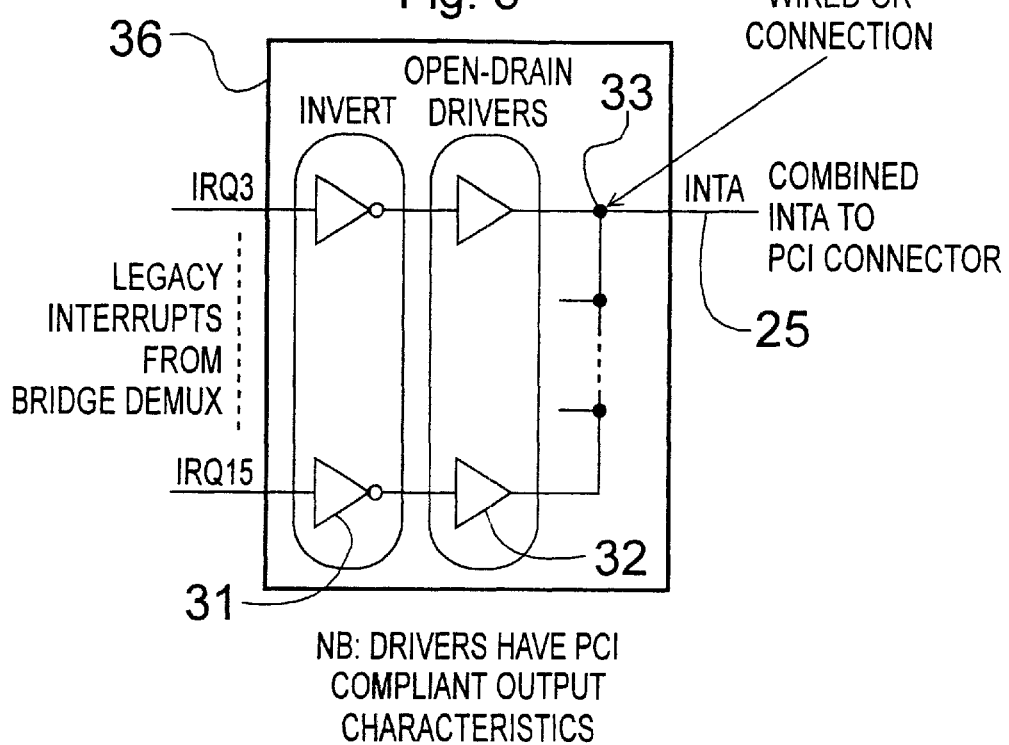
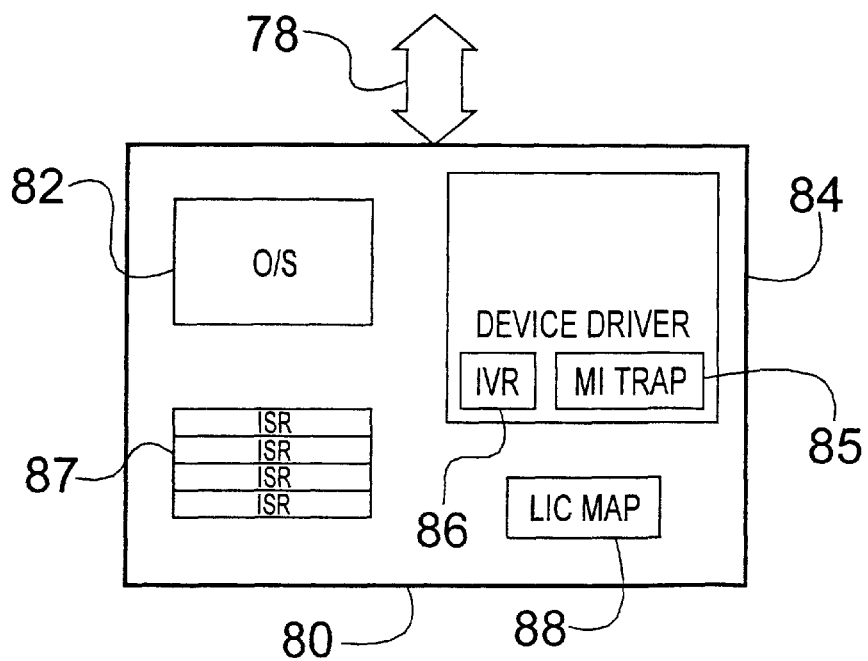

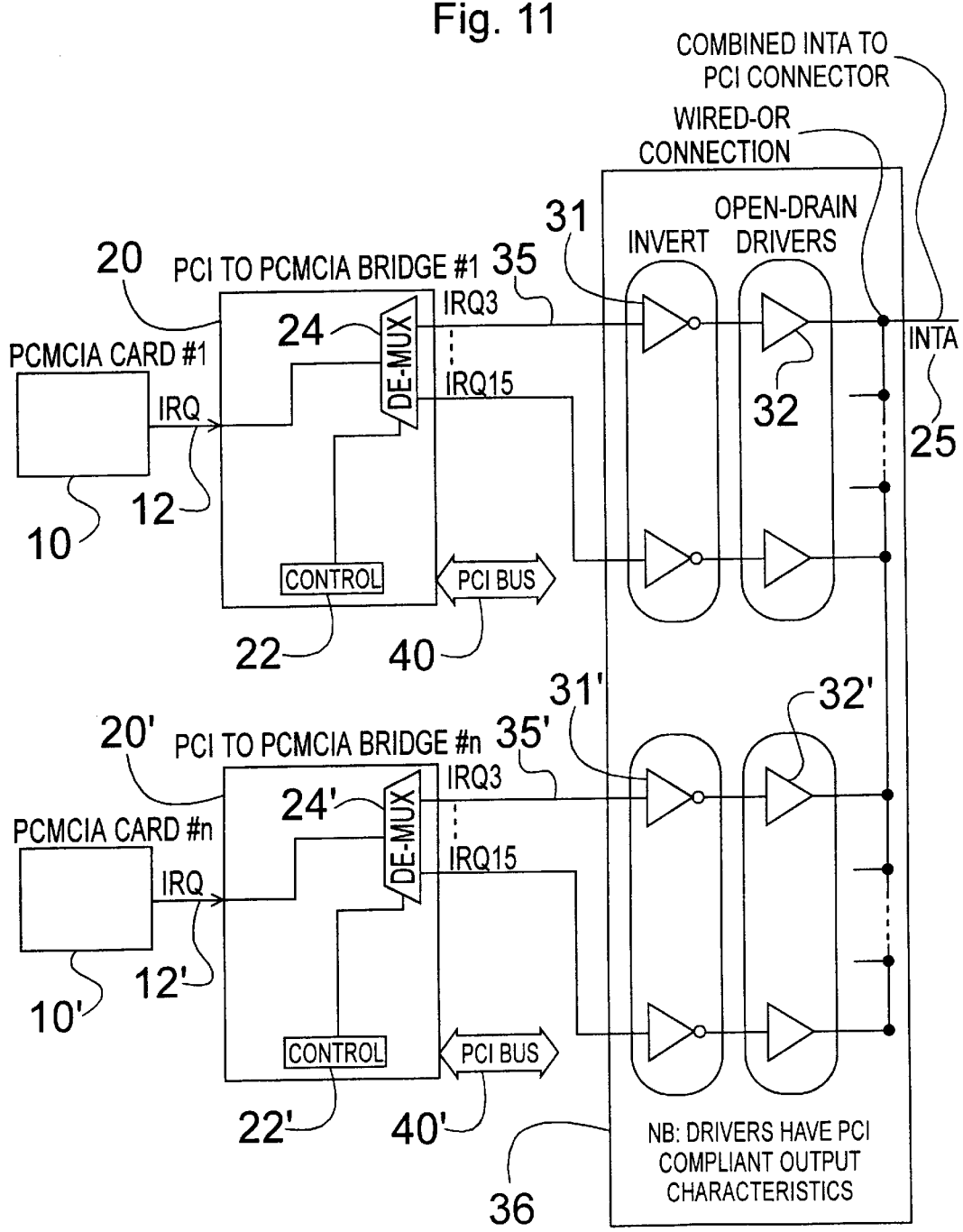

APPARATUS AND METHOD FOR HANDLING PERIPHERAL DEVICE INTERRUPTS

BACKGROUND OF THE INVENTION

The present invention relates to computer systems of the kind that allow peripheral devices to be plugged in and dynamically configured while the computer is running, more especially to the handling of interrupts generated by such peripheral devices.

Current personal computers (PC's) are designed to allow peripheral devices to be connected to the main system hardware.

One kind of bus for connecting peripheral devices is the Industry Standard Architecture (ISA) bus. The ISA bus is an older design of medium speed computer bus which has been in use since the 1980's and is still present on most current IBM compatible personal computers.

Another, more modern, kind of bus is defined by the Personal Computer Memory Card International Association (PCMCIA). Peripheral devices conforming to this standard are sometimes referred to as PCMCIA cards. The PCMCIA standard has been implemented in the form of a medium speed computer bus designed to allow miniature peripheral devices to be plugged into laptop and desktop computers, for example: modems, storage devices etc.

The PCMCIA bus is electrically similar to an ISA bus, but has the additional functionality of allowing dynamic configuration of a PCMCIA card by the PC as it is plugged in. This means that the computer does not have to be turned off to add new hardware in the form of a PCMCIA card. This capability is sometimes referred to using the terms "hot-insertion" and "plug-n-play". An automatic resource allocation and configuration process is effected by software and is invoked when a new piece of PCMCIA compliant hardware is detected by the PC. This process is designed to simplify hardware installation from the end-user's point of view.

Although PCMCIA cards are in widespread use and offer the advantage of a dynamic insertion capability, a problem arises when external PCMCIA cards are connected to a peripheral component interconnect (PCI) bus of a PC through a PCI-to-PCMCIA bridge, as will be described further below.

A PCI bus is the main system bus in many current PC's. A PCI bus is a high speed bus that can be used to transfer data and commands around the PC motherboard and beyond. The PCI bus standard provides four possible PCI interrupt signals; INTA#, INTB#, INTC# and INTD#, referred to generically as INTX#. A "typical" add-in PCI board will have only one function and will, by convention, only connect to INTA#. INTB# through INTD# are intended for additional optional functions on the same board and are used by so-called multi-function PCI boards. For example, a board that offers three distinct functions would connect INTA# to the first function, INTB# to the second and INTC# to the third.

A bridge is a generic two-port or multi-port device which connects to a PCI bus on one "side" and to another bus, on the other "side". The other bus can itself be a PCI bus, but equally it can be of any other type, for example a PCMCIA bus. A bridge serves to expand or extend the PCI bus system without violating the fundamental electrical parameters that define the PCI bus.

One function performed by a PCI-to-PCMCIA bridge is to map an input interrupt signal to one of sixteen outputs, corresponding to the legacy interrupt channels (LICs) which formed part of the ISA bus and that are implemented in current IBM compatible PC's. Interrupt mapping is the logical connection of an interrupt signal to one of the system's available LICs. The association is made by configuration of the bridge's hardware to direct the interrupt signal to the required LIC hardware line. The LICs are named IRQ0 to IRQ15 inclusive and originated from early IBM compatible PC's that used 8259 type interrupt controller chips. It is noted that due to the one-to-one correspondence between LICs and the interrupts used as part of the ISA bus, LICs are often referred to as "ISA interrupts". The LICs are distributed out among the system's internal and external peripheral devices, usually with each device being mapped to one LIC.

Each PCMCIA device can use a single interrupt and that interrupt is dynamically allocated to the PCMCIA device on installation by the operating system. The mapping is used to configure the bridge hardware and is also stored in the operating system's own internal configuration tables. Subsequently, the application software can obtain the LIC mapping from the operating system to determine the LIC that the PCMCIA card has been mapped to. The application software is thus able to register itself as an interrupt handler for the relevant LIC. The interrupt allocation is performed dynamically based on which LICs are currently free and what resource requirements other devices in the system may have. It is important to emphasize that the mapping is not fixed. It can change freely. For example, the operating system may allocate the same PCMCIA card LIC channel IRQ12 on one day and IRQ11 on the next day.

For a PCI-to-PCI bridge, all relevant interrupt signals are passed through the bridge. However, for a PCI-to-PCMCIA bridge connected via a PCI expansion connector, this is not the case. As a result software failure can occur when PCMCIA cards are plugged into an adapter device that uses a PCI-to-PCMCIA bridge connected to a PCI expansion connector. This situation is now described with reference to FIG. 1 of the accompanying drawings.

FIG. 1 shows a PCMCIA card 10 that is connected, or plugged into, a PCI-to-PCMCIA bridge 20 that is in turn connected to, or plugged into, a PCI expansion connector 30 of a PC by a corresponding bridge PCI expansion connector 29 that includes pins for the PCI bus data, and address and control lines 40, and the PCI interrupt lines 25 to 28. Certain internal components of the PC that are relevant to interfacing with the PCI expansion connector 30 are also shown, these components being labeled with reference numerals in the range 40 to 60.

The PC components illustrated are the PCI interrupt channel connections INTX# 41 to 44, and the PCI bus 40. The PCI bus 40 is connected to the main system PCI bus of the PC. The PCI interrupt channel connections 41 to 44 connect to respective demultiplexers 56 to 59 which serve to map the respective four PCI interrupts to their allocated LIC 60 for conveying IRQ0 . . . 15 between a programmable interrupt controller (PIC) 50 and the PC's peripheral devices, of which the illustrated PCI expansion connector 30 is but one. The demultiplexers 56 to 59 are components of system board PCI interrupt mapping circuitry 55.

The sixteen LICs 60 are connected to the programmable interrupt controller (PIC) 50. A PIC is a device that prioritizes and multiplexes the 16 LICs and sends an interrupt request to the processor for each LIC that is in an active state. Typical IBM compatible computers use two Intel 8259 PICs (or compatible) in cascade. Moreover, it is noted that the PCI interrupts once mapped to LICs are handled slightly differently from ISA-type interrupts since the PCI interrupts are level sensitive whereas the ISA-type interrupts are edge sensitive.

An interrupt sent to the processor by the PIC 50 constitutes an interrupt request to alert the processor that a device requires servicing by software. The interrupt is sent (or asserted) to the PIC using either an INTX# signal, or on the LIC interconnects 60 using an IRQ0 . . . 15, and then from the PIC to the processor on a dedicated processor signal line (not shown) using an INTX# signal, or on the LIC interconnects 60 using an IRQ0 . . . 15 signal. The interrupt request is then handled by the processor calling an appropriate interrupt servicing routine (ISR) in system software.

The PCMCIA card 10 has an interface including a single interrupt 12. In order for the interrupt 12 to be usable by the PC, the interrupt 12 is mapped to one of the LICs of the PC. This mapping process is done by a routing circuit in the form of a demultiplexer 24 controlled by a controller 22 that in combination direct the PCMCIA interrupt 12 to any one of the bridge LIC outputs 35. The controller 22 includes a register 23 that is addressable by the PC. The register 23 is used to store the LIC currently allocated to the PCMCIA card 10 by the PC. The allocated LIC is written to the control circuit register by the PC's processor. In addition, the system software maintains a LIC mapping record for all LICs, for example in the form of a table, in which the LIC to which the PCMCIA interrupt 12 is mapped will also be stored.

Although the bridge device 20 has connections 35 for each of the LICs, these are only useful when the bridge 20 is built onto the system board of the computer and the LICs can be physically wired up to the system's PIC 50. This would be possible for an internal PCI-to-PCMCIA bridge such as would be found in a laptop PC equipped with PCMCIA slots. However, for an adapter board using a PIC-to-PCMCIA bridge and plugged into a PCI expansion connector 30 on a desktop PC or other system with PCI expansion connectors, there is no connection from the bridge LIC connections 35 through to the PC.

The lack of connection between the bridge LIC connections 35 and the PC's internal LIC interconnects 60 means that any interrupt output on the LIC connections 35 from the bridge 20 is lost and will never reach the PIC 50.

On the one hand, the operating system is free to configure a PCI-to-PCMCIA bridge 20 to map the PCMCIA interrupt 12 to one of the LICs, since the bridge controller 22 is still freely addressable through the PCI bus.

On the other hand, the system is liable to software failure at any time, since none of the LIC bridge connections 35 are physically connected to the PC. For example, if software were to assign the PCMCIA card 10 to IRQ12 and configure the bridge hardware accordingly, then this interrupt would never reach the PIC 50 so that no interrupt request would ever get through to the processor. This in turn will mean that any application software that is waiting to receive interrupt requests on IRQ12 will never be alerted that the card 10 requires servicing and so the card and software will not work properly together.

In summary, although a PCMCIA card can be plugged into a PCI expansion connector through a PCI-to-PCMCIA bridge, immediate or sporadic software failure will result. What is needed is hardware or software, or a combination of both, that allows reliable operation of a computer system when a PCMCIA card is plugged into a PCI expansion connector through a PCI-to-PCMCIA bridge.

Here it is noted that the above-described problem does not occur with ISA-to-PCMCIA bridge devices, because on an ISA bus all free LICs are physically wired to the ISA expansion connector, thus providing direct electrical connection to the LICs that are wired inside the computer to an 8259-compatible PIC device.

SUMMARY OF THE INVENTION

Particular and preferred aspects of the invention are set out in the accompanying independent and dependent claims. Features of the dependent claims may be combined with those of the independent claims as appropriate and in combinations other than those explicitly set out in the claims.

According to a first aspect of the invention there is provided a computer system having a PCI expansion connector and further including:

an operating system operable to detect a PCI-to-PCMCIA bridge on the PCI expansion connector and in response thereto to allocate a legacy interrupt channel for interrupts originating from the PCI-to-PCMCIA bridge, and also operable to detect connection of a PCMCIA card to the PCI-to-PCMCIA bridge and in response thereto to allocate a further legacy interrupt channel for interrupts originating from the PCMCIA card; and a device driver for a PCI-to-PCMCIA bridge, the device driver including a trap mechanism operable to intercept PCI interrupts received through the PCI expansion connector and, in response to interception of a PCI interrupt, to call an interrupt management routine operable to determine if the PCI interrupt was generated by the PCMCIA card and, if so, to call an interrupt service routine using the PCMCIA card's allocated legacy interrupt channel as an operand.

The computer system of the first aspect of the invention is suitable for receiving a PCI-to-PCMCIA bridge, the bridge being connected to the computer system's PCI expansion connector. The bridge can be connected to the computer system's PCI expansion connector by a corresponding PCI expansion connector. The bridge may include a PCI interrupt pin for transmitting a PCI interrupt to a corresponding pin on the first mentioned PCI expansion connector; a PCMCIA connector for connecting to a PCMCIA card, the PCMCIA connector including a PCMCIA interrupt pin for receiving PCMCIA interrupts; and an interrupt converter arranged to convert PCMCIA interrupts received at the PCMCIA interrupt pin into PCI interrupts and to supply said PCI interrupts to the PCI interrupt pin of the PCI expansion connector.

According to a further aspect of the invention there is provided a method of handling an interrupt in a computer system including a PCI expansion connector, the method comprising:

(a) sensing a PCI-to-PCMCIA bridge on the PCI expansion connector;

(b) loading a device driver for the PCI-to-PCMCIA bridge, the device driver including an interrupt service routine for handling PCMCIA interrupts;

(c) allocating a legacy interrupt channel to the PCMCIA interrupts;

(d) detecting a PCMCIA interrupt; and (e) calling the interrupt service routine using the legacy interrupt channel allocated to PCMCIA interrupts as an operand.

The method may further comprise the steps of: (f) disabling detection of further PCMCIA interrupts after step (d) and before step (e); and (g) re-enabling detection of further PCMCIA interrupts after step (e).

According to another aspect of the invention, there is provided a device driver for handling interrupts from an external peripheral device in a computer system including a programmable interrupt controller (PIC) connected to receive interrupts on a plurality of legacy interrupt channel connections and including status registers for receiving read and write accesses relating to pending interrupts and returning an access result.

The device driver of this aspect of the invention is operable to handle interrupts from an external peripheral device that is connected to a peripheral connector of a computer system and that has an interrupt line that can be allocated a legacy interrupt channel, but is not connected in hardware to one of said legacy interrupt channel connections of the computer system. The device driver includes a PIC emulation routine operable to modify said access result for read accesses to at least one of said status registers so that the access result is returned in a state which it would have if said interrupt line of the external peripheral device were supplied in hardware to the PIC on that one of said legacy interrupt channel connections corresponding to the legacy interrupt channel allocated to the external peripheral device.

The device driver may be operable with a PIC in which one of said status registers is an in-service register for indicating an active one of any of said pending interrupts and wherein the PIC additionally comprises a command register. In this case, the PIC emulation routine is operable to set an in-service bit of said access result for read accesses to the in-service register when the previous write access to the command register was a command to access the in-service register.

Additionally, the PIC emulation routine may be operable to configure a debug register of a processor to trap read and write accesses to addresses within an address range including at least one of said status registers and, on trapping, to call a trap function for controlling interaction of the read and write accesses with the PIC.

Further aspects of the invention provide a carrier medium bearing the device driver. The carrier medium may be a transmission medium, such as an optical fiber, metal cable or carrier wave. The carrier medium may also be a recording medium, such as a magnetic storage device, an optical storage device, a read-only-memory (ROM) or other non-volatile memory.

Still further aspects of the invention are exemplified by the attached claims.

The various aspects of the invention thus provide a modified PCI-to-PCMCIA bridge together with a device driver for the bridge that allow reliable operation of a PCMCIA card plugged into a PCI expansion connector through the modified PIC-to-PCMCIA bridge.

BRIEF DESCRIPTION OF THE DRAWINGS

For a better understanding of the invention and to show how the same may be carried into effect reference is now made by way of example to the accompanying drawings in which:

FIG. 3 shows the internal structure of the combiner of the bridge shown in FIG. 2;

FIG. 4 shows internal hardware of a PC with PCI expansion connector into which the a PCI-to-PCMCIA bridge according to a first embodiment of the invention can be plugged in;

FIG. 5 shows the internal structure of the system memory of the PC shown in FIG. 4, including the device driver of the first embodiment;

FIG. 11 shows a PCI-to-PCMCIA bridge according to a third embodiment of the invention including multiple PCMCIA slots.

DETAILED DESCRIPTION

Figure 1:
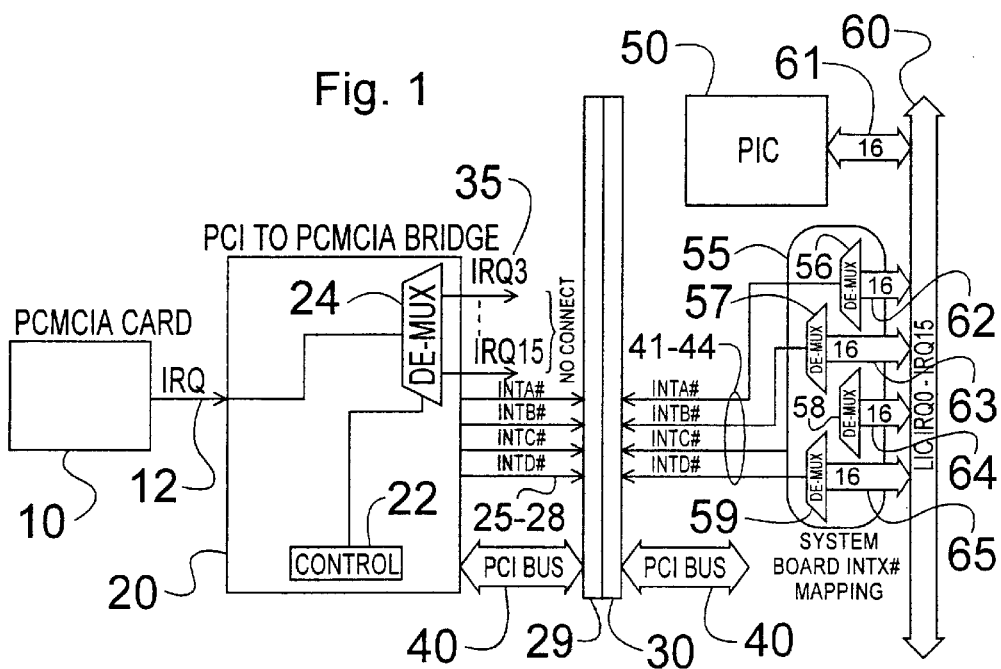
FIG. 1 shows a prior art PCI-to-PCMCIA bridge as it would be connected if plugged into a PCI expansion connector of a standard PC, a PCMCIA card plugged into the bridge also being shown.
Figure 2:
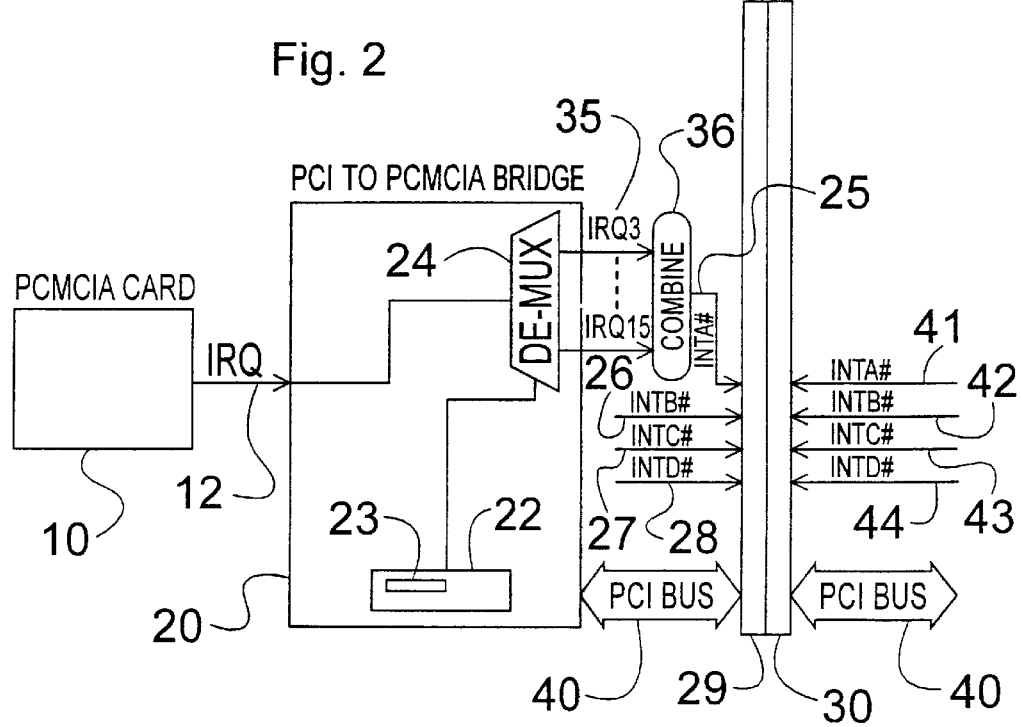
FIG. 2 shows a PCI-to-PCMCIA bridge according to a first embodiment of the invention plugged into a PCI expansion connector of a PC with a PCMCIA card connected to the bridge.

FIG. 2 shows a PCI-to-PCMCIA bridge 20 according to a first embodiment of the invention plugged into a PCI expansion connector 30 of a PC, together with a PCMCIA card 10 connected to the bridge 20. The PCI-to-PCMCIA bridge 20 is based on a standard prior art bridge, as illustrated and described further above with reference to FIG. 1. Referring to FIG. 2, the bridge 20 is modified in comparison with the standard bridge by the inclusion of a combiner 36 arranged on the output side of the demultiplexer 24. The combiner is connected to receive and logically combine the LIC outputs IRQ3 . . . IRQ15, and to output the combined signal to the INTA# line 25 leading to the INTA# pin of the PCI expansion connector. IRQ0 . . . 2 are not connected, since they are conventionally always used by the motherboard. It is conventional that neither the ISA bus nor bridge devices connect in any way to the LICs associated with IRQ0 . . . 2. As a result of the combiner 36, a PCMCIA interrupt signal routed by the controller 22 to any of the demultiplexer's outputs will be transmitted as a level-sensitive PCI interrupt to the INTA# interrupt pin of the bridge PCI expansion connector 29.

FIG. 3 shows the internal structure of the combiner 36 in more detail. The combiner 36 comprises a bank of inverters 31 arranged to receive and invert IRQ3 . . . 15 outputs of the demultiplexer 24. The bank of inverters 31 is in turn arranged in series with a bank of open-drain drivers 32 with PCI-compliant output characteristics. The outputs of the open-drain drivers are then connected together with a wired-or connection, the combined outputs being connected to the PCI INTA# interrupt line 25.

The design of the bridge 20 means that any interrupt from the PCMCIA card 10 on interrupt line 12 will cause an interrupt on the PCI interrupt line INTA# conveyed by connection 25 on the bridge side of the PCI expansion connector 29/30 and connection 41 on the PC side. Similarly, interrupts generated by the bridge 20 itself, for example on removal of a PCMCIA card from the bridge, will also cause an interrupt on the PCI interrupt line INTA# which is conveyed to the PC on the same lines used for interrupts originating from the PCMCIA card. The handling of the PCI interrupt INTA# by the PC is now described.

Figure 4:
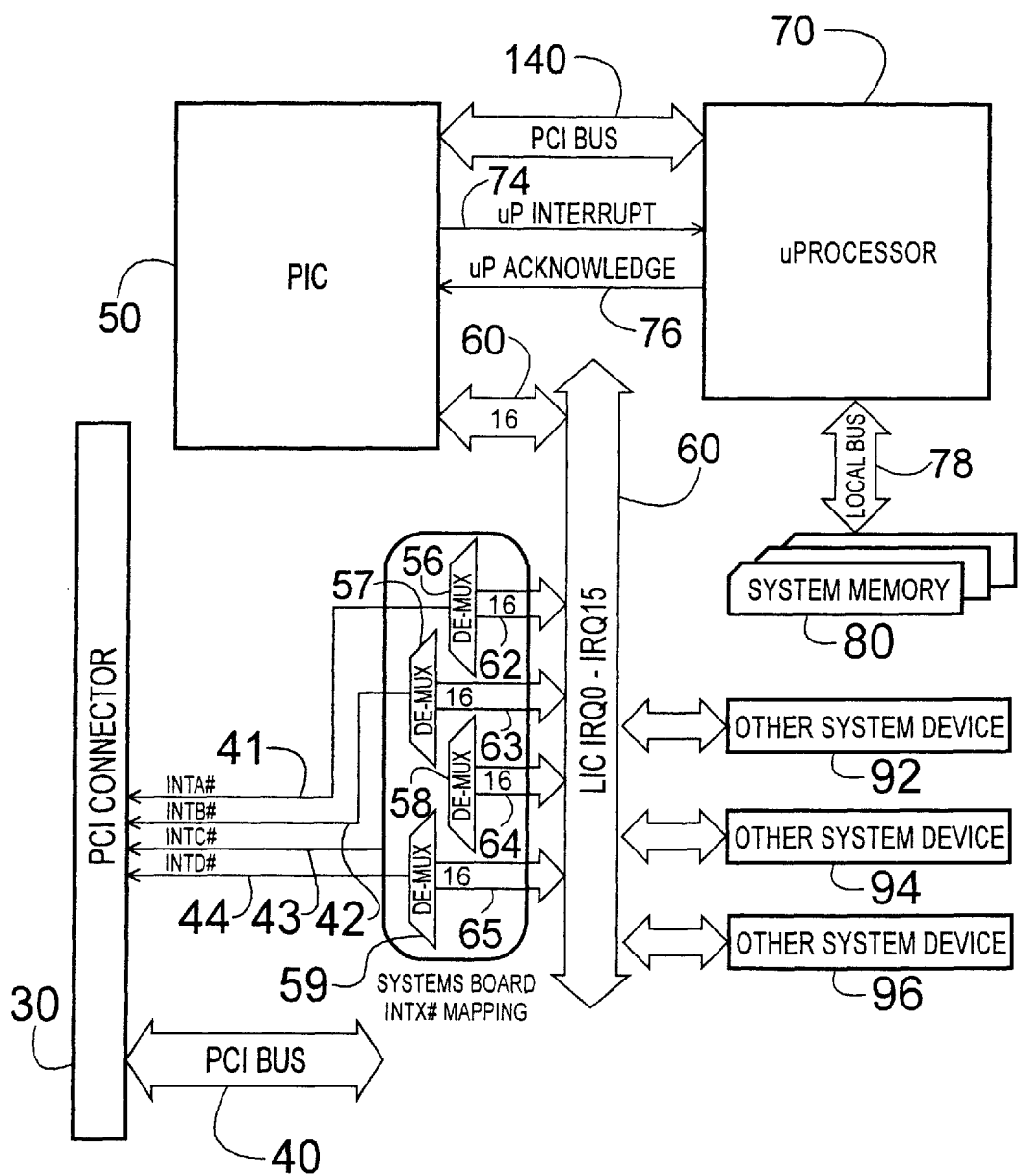

FIG. 4 shows elements of the PC's internal hardware related to interfacing with the PCI expansion connector 30 and to the handling of interrupts received through the PCI expansion connector 30.

The PC's system board has mapping circuitry 55 comprising demultiplexers 56 to 59 that are connected to the PCI interrupt channel connections INTX# 41 to 44 in the standard manner illustrated in and described with reference to FIG. 1. The PCI bus 40, LIC interconnects 60 and PIC 50 are all interconnected as illustrated in FIG. 1.

FIG. 4 also shows the PC's processor 70. The PIC 50 and processor 70 are interconnected by a PCI bus 140 and interrupt request and acknowledge lines 74 and 76 respectively. The interrupt request line 74 conveys an interrupt from the PIC 50 to the processor 70. The interrupt acknowledge line 76 conveys a "handshake" from the processor 70 to the PIC acknowledging receipt of an interrupt request.

As shown in FIG. 4, the processor 70 is connected to system memory 80 through a local bus 78 in a standard manner. Moreover, FIG. 4 also illustrates other peripheral devices 92, 94 and 96 which may be connected to the PIC through the LIC connections 60.

The system memory 80 may be a combination of cache memory, main memory, non-volatile memory and mass storage media, as is usual. As shown in FIG. 5, main memory 80 has residing therein a standard operating system 82, a custom bridge device driver 84, standard interrupt service routines (ISRs) 87 and a standard LIC mapping record 88.

The operating system is operable to detect the presence of a PCI-to-PCMCIA bridge 20 on the PCI expansion connector 30 and, in response thereto, to allocate a legacy interrupt channel for interrupts originating from the PCI-to-PCMCIA bridge 20. The LIC mapping record 88 is then updated to record the LIC mapping of the bridge 20, again as is standard. The bridge is thus treated as a device in its own right.

The operating system is also operable to detect connection of a PCMCIA card to the PCI-to-PCMCIA bridge, for example through insertion of a PCMCIA card into a slot provided on the bridge. In response to detection of the presence of a PCMCIA card, the operating system allocates a legacy interrupt channel for interrupts originating from the PCMCIA card received on the IRQ line 12, again as is standard. The LIC mapping record 88 is then updated to record the LIC mapping of the PCMCIA card 10, again as is standard.

On the PC side of the PCI connector, the interrupts received on the PCI INTA# interrupt line 41 are demultiplexed by demultiplexer 56 and routed to a specific LIC channel connection 60. In the present embodiment, the LIC in the PC to which the INTA# PCI interrupts are routed is the LIC allocated to the bridge 20 as a device in its own right. However, in principle the LIC in the PC allocated to the INTA# PCI interrupts need not be the bridge interrupt. In the following, the LIC allocated in the PC to interrupts received on interrupt line INTA# is referred to as the master interrupt (MI).

The bridge device driver 84 includes an MI trap mechanism 85 for intercepting master interrupts.

The bridge device driver 84 further comprises an interrupt management routine 86 for handling the intercepted interrupts. The interrupt management routine 86 handles the MI either as a PCMCIA interrupt or a bridge interrupt, as appropriate, compensating for the fact that the PCMCIA interrupt is not connected in hardware to the corresponding LIC channel connections 60 in the PC. This process is described in the following as interrupt virtualization, the interrupt management routine being referred to as the interrupt virtualization routine (IVR) 86.

The handling by the apparatus of the first embodiment of PCMCIA card or bridge interrupts asserted on the INTA# PCI interrupt line 25 is now described with reference to FIG. 6.

In Step S2 the operating system is performing general system control and support functions.

In Step S4 the PCMCIA card 10 asserts an interrupt signal on the PCMCIA interrupt request line 12, or the bridge 20 generates an internal interrupt.

In Step S6 the PCMCIA card or bridge interrupt is routed by the bridge 20 to cause an interrupt on the PCI interrupt line INTA#41, which in turn causes an interrupt on the master interrupt line LIC connection 60.

In Step S7 the INTA# PCI interrupt is trapped by the MI trap mechanism 85.

In Step S8 the IVR 86 is called by the MI trap mechanism.

In Step S9 the IVR inspects control registers in the bridge controller 22 to determine whether the bridge itself or the PCMCIA card 10 was the origin of the trapped interrupt.

If the bridge is determined to be the interrupt source, then the IVR jumps to Step S28 to allow the operating system to handle the bridge's interrupt. This condition can only arise when the bridge and the PCMCIA card are both allocated the same LIC, as can happen in certain "interrupt sharing" schemes found in some operating systems, Windows NT4 being one such example.

On the other hand, if the PCMCIA card is determined to be the interrupt source, then the process flow passes instead to Step S10.

In Step S10 the PCMCIA card LIC mapping is fetched. This is performed in the present embodiment by reading the register 23 in the bridge controller 22. In an alternative embodiment, this information is read instead from the LIC mapping record 88 of the system memory 80.

Step S12 initiates interrupt masking. Interrupt masking stops an un-handled interrupt from causing failure of the computer system. An un-handled interrupt is one where the interrupt service routine does not change the state of the PCMCIA card to make the interrupt de-assert. As a result, another similar interrupt request is generated immediately on completion of the interrupt service routine, thus locking up the computer system by repeated ISR calls.

Interrupt masking is effected by setting the PCMCIA card LIC mapping in the bridge so as to disable the interrupt. In this embodiment, the PCMCIA card LIC mapping is set to a zero value, the bridge hardware being configured to disable interrupts on LIC zero. Referring to FIG. 3 it can be seen that only IRQ3 . . . 15 are routed to the PCI interrupt lines 25 and 41. In theory, un-handled interrupts should never happen, because all the interrupt service routines should de-assert the calling interrupt on completion. However, it has been established that in the case of PCI interrupts, which are level-sensitive rather than edge-sensitive, problems with unhandled interrupts may arise. A similar problem has not been observed for ISA interrupts and this is believed to be due to their edge-sensitive nature.

In Step S14 a hardware interrupt for the LIC value obtained in Step S10 is simulated. The hardware interrupt is simulated by a software INT instruction, which is a standard operating system code (i.e. a processor opcode). The INT instruction calls the ISR of the appropriate software application using the bridge LIC as an operand.

Steps S16 and S18 show the interrupt service routine call as performed under control of the operating system 82.

Steps S22 onward then relate to unmasking of the interrupt that was effected in Step S12. If Step S12 is omitted, then the interrupt virtualization routine can be finished at this point, directly jumping to step S28. However, in the embodiment with interrupt masking as shown in FIG. 6, the interrupt virtualization routine proceeds further as follows.

In Step S22 checking is performed to establish whether the simulated interrupt call made in Step S14 made a call to a valid interrupt service routine.

In Step S24, if it is determined in Step S22 that the interrupt was serviced by a valid interrupt service routine, then the process flow is transferred to Step S26.

Step S26 restores the PCMCIA card LIC mapping from zero to the true mapping value allocated by the operating system on card configuration. In other words, the PCMCIA card LIC value is returned to the value which it had prior to Step S12. Interrupts from the PCMCIA card 10 are thus re-enabled.

In Step S28 the interrupt virtualization routine finishes and control is returned to the operating system.

In Step S30 control is passed back to the operating system after the end of the interrupt virtualization routine.

Returning to Step S24, if it is determined in Step S22 that the interrupt was not serviced by a valid interrupt service routine 87, then process flow is transferred to Step S100. The determination is made by checking whether the interrupt signal from the PCMCIA card is de-asserted. Additionally, the PIC status can be checked to establish whether the interrupt servicing has been completed. In the present embodiment, this is achieved by checking the contents of the mask register 53. In other embodiments, PIC status checking may be different, depending on how the operating system is designed, for example.

Step S100 sets up, under control of the operating system, a deferred call-back to return to the interrupt virtualization routine after some time delay. Typically, the delay time may have a value of one or more milliseconds, for example ten milliseconds. The time delay needs to be sufficiently long that repeated calling of the interrupt virtualization routine by an interrupt that has not been de-asserted will not result in undue delays to other computer tasks.

Step S101 shows the operating system making a call to a part of the interrupt virtualization routine at the end of the deferred call-back period. The operating system call will initiate an interrupt virtualization sub-routine which has the same effect as Step S26 of the main interrupt virtualization routine. Namely, Step S102 has the effect of restoring the PCMCIA card LIC mapping. Subsequent to Step S102, the subroutine is finished and control is returned to the operating system in Steps S103 and S104.

Figure 6:
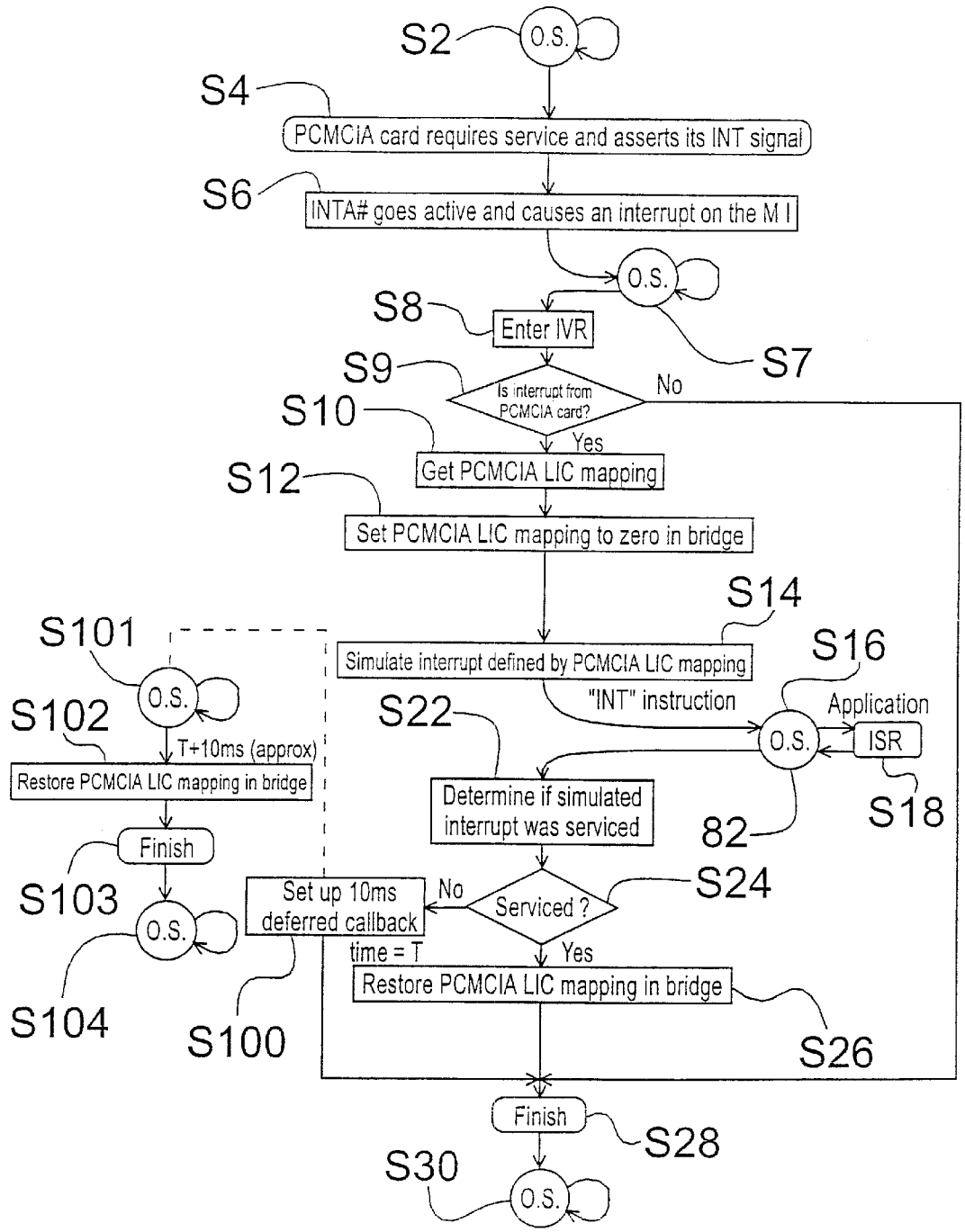
FIG. 6 is a flow diagram showing the handling of PCMCIA interrupts according to the first embodiment of the invention.

In FIG. 6, the interrupt virtualization sub-routine is illustrated as a separate routine in Steps S101 to S104. However, it will be understood that the deferred callback instruction made by the operating system could equally well be a direct jump to Step S26 of the main interrupt virtualization routine.

The deferred call-back capability ensures that even if an un-handled interrupt occurs, the IVR will attempt to service the interrupt at a later point in time and so will never permanently disable interrupts from the PCMCIA card 10. This is useful because spurious and un-handled interrupts can occur when a PCMCIA card is being configured, even when there are no underlying hardware or software faults. The deferred call-back thus avoids the situation in which all subsequent potentially valid interrupts are blocked as a result of one or more spurious or un-handled interrupts occurring. In this way, normal operation of a PCMCIA card will not be permanently prevented when interrupts are not correctly handled for whatever reason.

Figure 9:
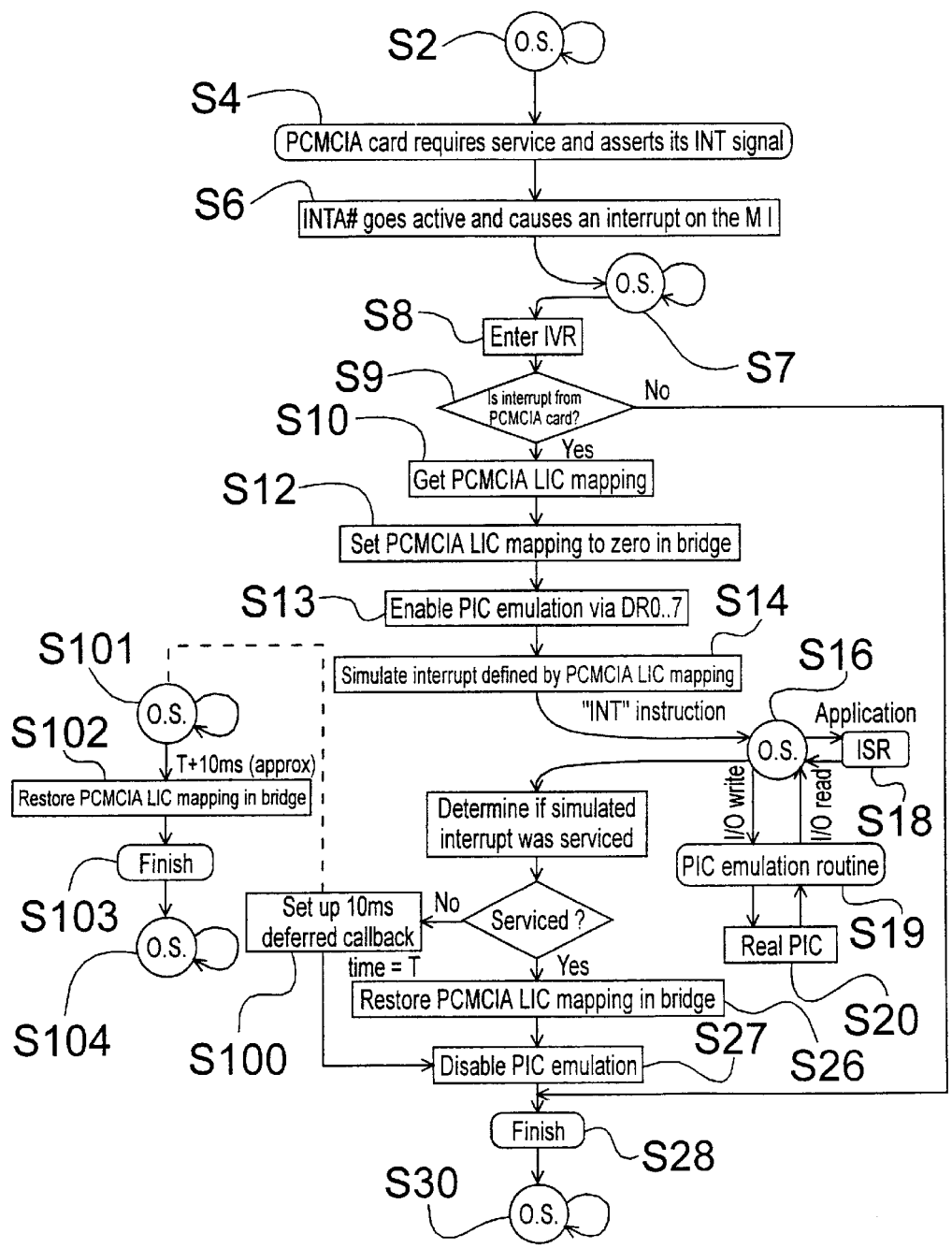
FIG. 9 is a flow diagram showing the handling of PCMCIA interrupts according to the second embodiment.

FIG. 9 shows the process flow of an interrupt virtualization routine according to a second embodiment of the invention. The structural elements of the second embodiment are as shown and described in relation to FIG. 4 and FIG. 5 relating to the first embodiment. The IVR of the second embodiment makes use of internal hardware of the processor and PIC not previously described. This additional internal hardware is thus first described with reference to FIG. 7.

Figure 7:
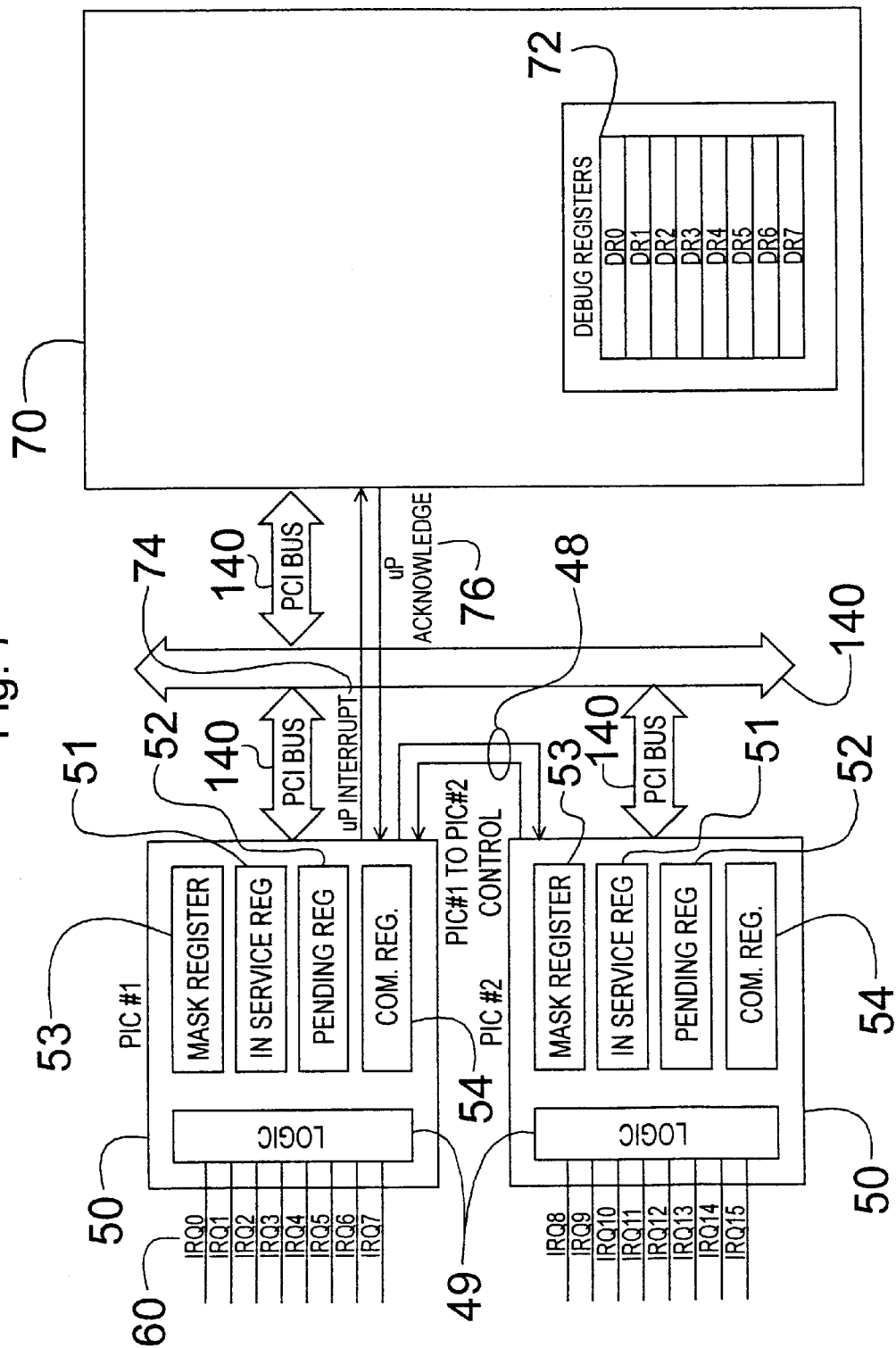
FIG. 7 shows internal structure of a processor and PIC relevant to the second embodiment.

FIG. 7 shows the PIC 50 and processor 70, interconnected by the PCI bus 140 and interrupt request and acknowledge lines 74 and 76, as previously described with reference to FIG. 4.

As is illustrated in FIG. 7, the PIC 50 is implemented as two 8259-compatible PIC devices in cascade interconnected by control lines 48. Each PIC device services eight LICs 60, namely IRQ0 . . . 7 and IRQ8 . . . 15 respectively. Moreover, each PIC device includes logic 49 for receiving interrupt signals on the associated LICs 60, a PIC command register 54 for receiving commands from the processor 70 and a set of PIC status registers 51 to 53. The PIC status registers include an in-service register 51, a pending register 52 and a mask register 53, the latter of which is used for configuration as well as status checking. The 8259-type PIC devices also include further registers, but these are not mentioned as they are not of direct relevance to the present embodiment. Each PIC device is configured so that incoming interrupts on LICs 60 are latched by the logic 49.

The pending registers 52 are used to record any interrupt that remains active for a minimum time on the logic 49. When this interrupt has the highest priority among the pending interrupts, the PIC sends an interrupt request to the processor via the interrupt request line 74 and, at the same time, sets a corresponding in-service bit in the in-service register 51 to signify that the interrupt concerned is currently being serviced. The processor 70 handshakes the PIC 50 through acknowledge line 76 to acknowledge that the processor will call the corresponding interrupt service routine for the interrupt in question. When the processor 70 has completed the call to the interrupt service routine it clears the corresponding pending bit in the appropriate pending register 52 which in turn clears the corresponding in-service bit in the relevant in-service register 51.

The mask registers 53 are used to prevent the PIC being responsive to any one or ones of the LICs, i.e. to stop those LICs from causing interrupts. A mask bit in the appropriate mask register is set either to disable any LIC that is unused by the system, i.e. not assigned to any peripheral device, or temporarily to disable that LIC while it is being serviced in software.

The processor 70 includes a set of debug registers 72, labeled DR0 . . . 7. The debug registers are general purpose registers provided to assist debugging of new hardware and software. The processor has special opcodes for reading from and writing to the debug registers. Typically, the debug registers may be used to trap read or write accesses, collectively referred to as data accesses, to any I/O devices within an address range specified in the debug registers. In the case of an Intel Pentium processor, for example, the address range will be specified in the debug registers DR0, DR1 and DR2. When the processor encounters an opcode that attempts an access to I/O within a reserved address range, control is passed instead to a target address specified in the debug register alongside the reserved address range. Typically, the target address will be the start address of a trap handling routine residing in memory 80.

The IVR of the second embodiment differs from that of the first embodiment through the addition of software emulation of certain activities of the programmable interrupt controller (PIC) 50. The PIC emulation is controlled by using the debug registers to trap I/O accesses to the PIC 50.

Figure 8:
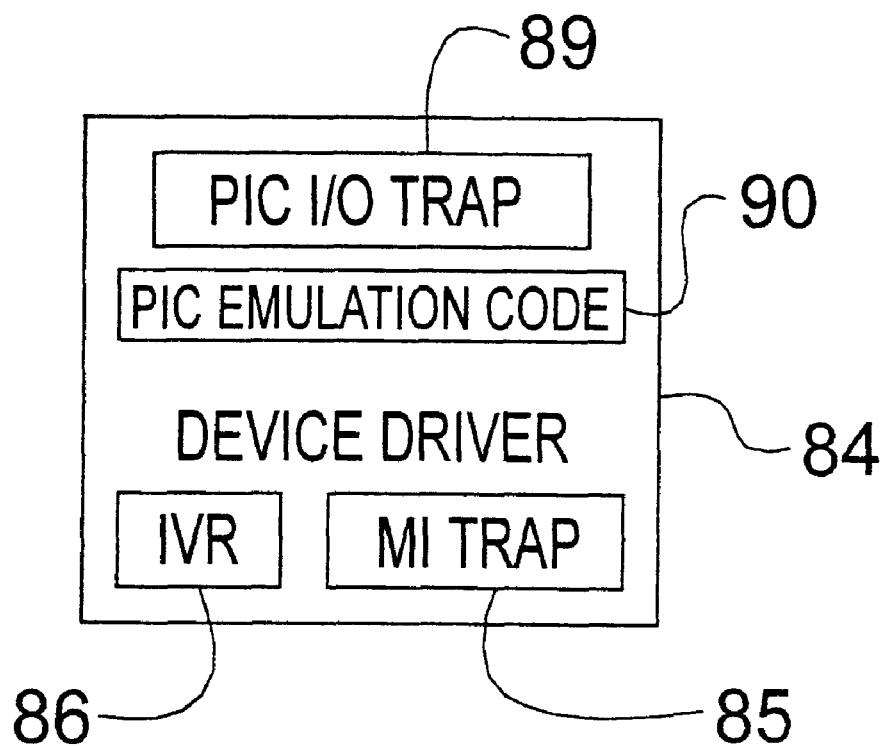
FIG. 8 shows the device driver of a second embodiment of the invention.

FIG. 8 shows a device driver 84 of the second embodiment that includes a PIC I/O trap routine 89 and PIC emulation code 90 in addition to the interrupt virtualization routine 86 and MI trap mechanism 85 provided in the first embodiment. As is now described in more detail below, the second embodiment uses the debug registers to trap I/O accesses to the PIC 50 and pass control to the PIC I/O trap routine 89 that in turn calls PIC emulation code 90 to activate the PIC emulation function.

The IVR of the second embodiment proceeds through Steps S2, S4, S6, S7, S8, S9, S10 and S12 as described in connection with the first embodiment. However, between Steps S12 and S14 there is an additional Step S13 for enabling emulation of certain PIC responses.

Step S13 configures the processor's de-bug registers 72 to cause a trap whenever access is made to a specific address range that includes the in-service register 51 of the PIC 50. The PIC contains a number of status registers to allow software to determine which interrupt signals are active and an in-service register 51 to allow software to determine which one of the active interrupt signals is currently being serviced (if any). The trap intercepts any I/O access of the in-service register 51 and calls a PIC emulation routine. PIC emulation is enabled by loading an address range to be trapped, a vector address for the PIC I/O trap routine 89 and a set of configuration bits that force the processor 70 to call the PIC I/O trap routine 89 at the vector address every time an I/O access is attempted with the address range that has been defined. The Intel Pentium processor for example allows up to three trap address ranges to be set. The PIC emulation technique can be used in any processor in which de-bug registers are provided. De-bug registers are intended for de-bugging and not for run time use. Consequently, the use during run time of the de-bug registers for PIC emulation is generally unproblematic.

The PIC emulation routine inserts status bits into a return value of an I/O access to the in-service register so that the I/O access source will receive a return value consistent with the existence of a pending interrupt on the legacy interrupt channel that is being virtualized.

With current operating systems and systems software, the in-service register 51 of the PIC 50 is perhaps the most important to emulate, because many software applications read the in-service register to check whether the PIC has correctly acknowledged an interrupt, or whether it can be dismissed as being spurious, for example due to a voltage spike. With the hardware configuration shown in FIGS. 2 to 5, there will never be a matching in-service bit in the in-service register 51 for the interrupt being virtualized because the physical interrupt line to the PIC is never activated. PIC emulation thus has the purpose of intercepting accesses to the inservice register 51 and inserting a corresponding in-service bit in the data that the PIC 50 returns.

Without PIC emulation, the operating system may dismiss some of the virtualized interrupts as spurious because it cannot reconcile the PICs status with the fact that the interrupt request has apparently occurred, due to the INT opcode execution.

It will be understood that the emulation of further registers of the PIC 50 can be performed in a similar fashion and will be useful when the computer has an operating system or system software that is liable to make data accesses to those additional parts of the PIC 50.

Referring once more to FIG. 9, the PIC emulation routine is enabled before the simulated interrupt call is generated in Step S14. To recap, Step S14 issues an INT instruction calling an interrupt service routine and specifies the virtualized LIC interrupt as an operand. Any I/O access made by the ISR in Step 18 to an address within a trapping range set in Step S13 causes the PIC emulation routine to be called. As indicated in FIG. 9, the PIC emulation routine acts as a buffer between the ISR and the PIC.

Figure 10:
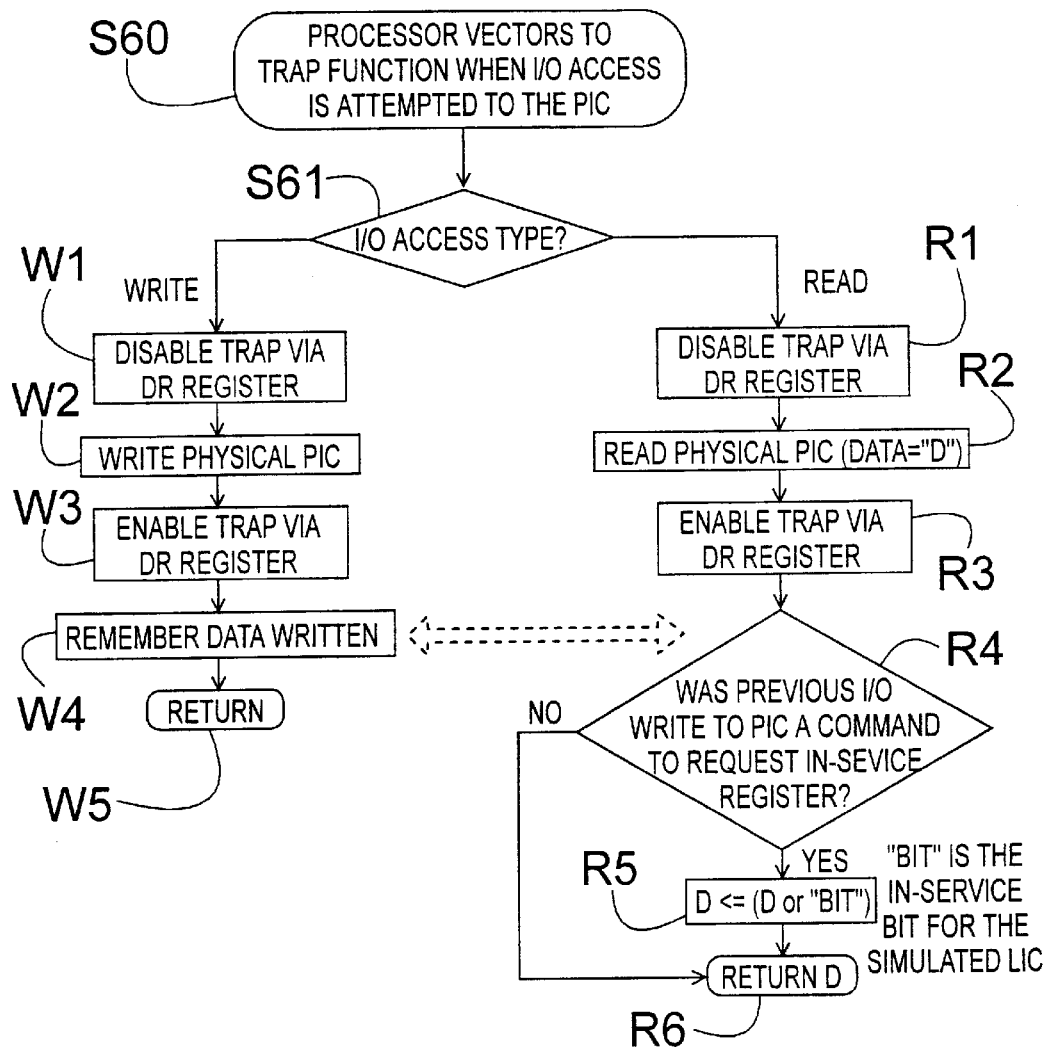
FIG. 10 is a flow diagram showing the PIC emulation routine of FIG. 9 in more detail.

FIG. 10 shows the process flow of the PIC emulation routine. The PIC emulation routine initiates whenever an I/O access to a reserved address is made. This is shown in Step 60. In Step 61, the I/O access type is distinguished. Write accesses are handled by Steps W1 to W5 and read accesses by Steps R1 to R6.

To allow the reserved addresses in the PIC to be written to, the trapping action invoked in Step S13 is first disabled in Step W1.

In Step W2, the PIC write is then performed.

In Step W3, the trapping action is re-enabled to prevent subsequent direct writes to reserved PIC addresses.

In Step W4, the data written to the PIC in Step W2 is then stored together with the address to which it was stored. This is used for handling read accesses as is now described.

In Step W5, the PIC emulation routine completes by returning to the code that made the trapped I/O access.

Read accesses progress initially in an analogous fashion to write accesses. The trapping action is disabled in Step R1, in Step R2 the requested reserved PIC address is read to obtain a multi-bit data value D, and in Step R3 the trapping action is reenabled. Data value D has bit-wise correspondence with IRQ0 . . . 15. Two separate 8-bit registers from the two cascaded 8259's need to be fetched to obtain the whole 16-bit status. Each bit holds the in-service status of one LIC.

In Step R4 it is then determined if the most recent write access was a command specifying that the next read access should return the contents of the in-service register. (This mechanism is particular to the 8259 PIC).

If yes, the Step R5 is performed to 'set' the in-service bit to the return data value D, i.e. the result of the read access. This is performed by tagging a 'set' bit to the data value D using a logical OR operation, the 'set' bit being in the position corresponding to the virtualized interrupt.

In Step R6, the data value D is either returned with the in-service bit set in Step R5, or is returned unaltered as decided at Step R4.

During the time over which the PIC emulation is enabled, the PIC I/O trap routine is thus solely responsible for accessing the physical PIC hardware. The normal trapping action of the PIC emulation routine is temporarily disabled during read and write accesses so that the physical I/O addresses within the trapped range or ranges can be read or written to. The PIC emulation routine thus allows the interrupt service routine to proceed in the same way as it would if the PCMCIA interrupt was directly connected in hardware to its allocated legacy interrupt channel.

Referring to FIG. 9 once more, after completion of the interrupt service routine, the process flow passes to Step S22 and then proceeds through the subsequent steps generally in the same manner as described with reference to the first embodiment to restore the PCMCIA card LIC mapping, but with the addition of a further Step S27 inserted between Steps S26 and S28. Step S27 disables PIC emulation by reconfiguring the de-bug registers thereby to cease trapping of PIC status register address ranges. Moreover, after the deferred call-back has been set up in Step S100, the process flow is directed to Step S27 so that the PIC emulation is disabled at that point in the process flow before finishing the IVR.

The additional functionality of PIC emulation provided by the second embodiment is only necessary in some cases.

PIC emulation will generally not be necessary for an operating system that only checks the in-service bit of the in-service register 51 for interrupts IRQ7 and IRQ15, but does not check any of the other interrupts. Interrupt lines IRQ7 and IRQ15 are conventionally reserved for internal peripheral devices. IRQ7 is typically reserved for a printer port and IRQ15 for a hard disk. As a result, IRQ7 and IRQ15 will not usually be allocated to a PCMCIA peripheral device. Consequently, none of the interrupt channels available for allocation to a PCMCIA card will result in an operating system access of PIC status registers. Because of this, the interrupt virtualization routine of the first embodiment will function perfectly adequately and there is no advantage in providing PIC emulation. The reason for the special nature of IRQ7 and IRQ15 is that the PIC uses these channels as a default vector when it detects a spurious interrupt, i.e. an interrupt which asserts then de-asserts before the minimum latch time has elapsed. Such interrupts are signaled to the operating system as a call to the ISR for IRQ7 or IRQ15, but with the corresponding in-service bit cleared.

On the other hand, a PIC emulation capability will generally be required for an operating system that is free to map a general peripheral device interrupt to IRQ7 or to IRQ15. A PIC emulation capability will also be required for an operating system that includes opcodes that cause PIC register tests on general peripheral device interrupt lines.

FIG. 11 shows a bridge device according to a third embodiment capable of receiving plural PCMCIA cards. With reference to FIG. 2 and FIG. 3 it can be seen that the bridge of the third embodiment comprises the components of 'n' conventional bridges each comprising a demultiplexer 24. FIG. 11 shows two such bridges, a first bridge 20 and an nth bridge 20'. The components of the first bridge are labeled with the same reference numerals as in FIG. 2 and those of the nth bridge with similar primed reference numerals. The outputs from IRQ3 . . . 15 of each multiplexer are routed through a bank of inverters 31 and 31' arranged to receive and invert the IRQ3 . . . 15 outputs of the demultiplexers 24 and 24'. The bank of inverters 31 are in turn arranged in series with a bank of open-drain drivers 32 and 32' which have PCI-compliant output characteristics. The outputs of the open-drain drivers 32 and 32' are then connected together with a wired-or connection, the combined outputs being connected to the PCI INTA# interrupt line 25.

For the third embodiment, the IVRs of either the first or second embodiments can be extended to virtualize multiple LICs from the same bridge so long as the bridge contains separate mapping registers for the LIC's of each of the PCMCIA card slots and the bridge itself, and also has status reporting registers that allow the source of the interrupt to be determined from the PC, i.e. the determination of the interrupt source by the IVR. This technique can been used, for example, to virtualize interrupts from two PCMCIA cards plugged into a single bridge device that supports two PCMCIA slots. In this case, a common IVR is used to handle any interrupt on the MI which then simulates the appropriate interrupt for each card if it finds that the corresponding PCMCIA card's interrupt line is active, each PCMCIA slot being allocated its own LIC by the operating system.

It will be understood that, although the above-described embodiments describe routing of the PCMCIA interrupts through PCI interrupt INTA#, the PCMCIA interrupts could be routed through any of the PCI interrupts in which case the MI trap mechanism 85 of the bridge device driver would merely require alteration to trap on the chosen PCI interrupt.

Moreover, it will be understood that, although the above-described embodiments relate to the 16-bit variant of the PCMCIA bus standard, other embodiments can be realized with the 32-bit "Cardbus" variant of the PCMCIA bus standard.

Further, it will be understood that references to PCI buses, connectors etc. are intended to include backwards-compatible hardware that may be provided in future computer systems when PCI has become obsolete or obsolescent, analogous to the way in which current hardware is backwards compatible to 8259 PICs through the use of legacy interrupt channels. For example, a bridge of the future may include a connector which has PCI bus emulation pins, or a future computer may include a software-driven PCI emulation capacity for an external peripheral device port based on some future standard.

Moreover, although the invention has been described with reference to an external peripheral device, it will be understood that it will function equally well for internal peripheral devices. For example, it may find utility to allow internal peripheral devices to continue to function when the hardware link between a legacy interrupt channel of the internal peripheral device and the system board PIC is broken or absent. It may also be modified to provide detection of such a hardware fault.

Still further, although the above described embodiments of the invention refer to virtualization of PCMCIA interrupts, it will be understood that further embodiments of the invention may relate to other kinds of external peripheral device interrupts which can be routed into a single PCI interrupt line, wherein the origin of the interrupt can be determined by a suitable device driver providing trapping, virtualization and, if necessary, PIC emulation of the interrupts received on that PCI interrupt line in a manner analogous to that described above in relation to the first to third embodiments. The source of the interrupt is determined by inspection of registers or other status holding areas within the external peripheral device or inter-connecting bridge.

It will be appreciated that although particular embodiments of the invention have been described, many modifications/additions and/or substitutions may be made within the spirit and scope of the present invention.

What is claimed is:

1. A computer system having a PCI expansion connector and further including:
   an operating system operable to detect a PCI-to-PCMCIA bridge on the PCI expansion connector and in response thereto to allocate a legacy interrupt channel for interrupts originating from the PCI-to-PCMCIA bridge, and also operable to detect connection of a PCMCIA card to the PCI-to-PCMCIA bridge and in response thereto to allocate a further legacy interrupt channel for interrupts originating from the PCMCIA card; and
   a device driver for a PCI-to-PCMCIA bridge, the device driver including a trap mechanism operable to intercept PCI interrupts received through the PCI expansion connector and, in response to interception of a PCI interrupt, to call an interrupt management routine operable to determine that one of said legacy interrupt channel and said further legacy interrupt channel associated with the intercepted PCI interrupt and to call an interrupt service routine using the determined legacy interrupt channel as an operand.

2. A computer system according to claim 1, wherein the device driver is operable to suppress responding to further PCI interrupts during pendancy of an interrupt service routine called using said further legacy interrupt channel as an operand.

3. A computer system according to claim 2, wherein the device driver is operable to suppress responding to said further PCI interrupts by temporarily changing the legacy interrupt channel allocated to the PCMCIA card to a legacy interrupt channel to which the computer system is not responsive.

4. A computer system according to claim 3, wherein the temporarily allocated legacy interrupt channel is legacy interrupt channel zero.

5. A computer system according to claim 1, further comprising a programmable interrupt controller (PIC) connected to receive interrupts on a plurality of legacy interrupt channel connections and including PIC status registers for receiving read and write accesses relating to pending interrupts and returning an access result, wherein the device driver further includes a PIC emulation routine that can be selectively switched between an enabled state and a disabled state by the interrupt management routine, wherein the PIC emulation routine in its enabled state acts to modify said access result for read accesses to at least one of said PIC status registers so that the access result is returned in a state which it would have if interrupts originating from the PCMCIA card were supplied in hardware to the PIC on one of said legacy interrupt channel connections.

6. A computer system according to claim 5, wherein the PIC further includes a command register and one of said PIC status registers is an in-service register for indicating an active one of any of said pending interrupts, the PIC emulation routine acting in its enabled state to set an in-service bit of said access result for read accesses to the in-service register when the previous write access to the command register was a command to request access to the in-service register.

7. A computer system according to claim 5, further comprising a processor having a debug register, wherein the PIC emulation routine in its enabled state configures the debug register to trap read and write accesses to addresses within an address range including at least one of said PIC status registers and, on trapping, to call a PIC I/O trap routine for controlling interaction of the read and write accesses with the PIC.

8. A computer system according to claim 1 having a PCI-to-PCMCIA bridge connected to the PCI expansion connector, the bridge comprising:
a further PCI expansion connector connected to the first-mentioned PCI expansion connector and including a PCI interrupt pin for transmitting a PCI interrupt to a corresponding pin on the first mentioned PCI expansion connector;
a PCMCIA connector for connecting to a PCMCIA card, the PCMCIA connector including a PCMCIA interrupt pin for receiving PCMCIA interrupts; and
an interrupt converter arranged to convert PCMCIA interrupts received at the PCMCIA interrupt pin into PCI interrupts and to supply said PCI interrupts to the PCI interrupt pin of the PCI expansion connector.

9. An apparatus comprising a computer with a PCI bus and a PCI-to-PCMCIA bridge connected to the computer's PCI bus,
the PCI-to-PCMCIA bridge comprising:
a PCI expansion connector including a PCI interrupt pin for transmitting a PCI interrupt;
a PCMCIA connector for connecting to a PCMCIA card, the PCMCIA connector including a PCMCIA interrupt pin for receiving PCMCIA interrupts; and
an interrupt converter arranged to convert a PCMCIA interrupt received at the PCMCIA interrupt pin into a PCI interrupt and to supply the PCI interrupt to the PCI interrupt pin of the PCI expansion connector;
and the computer comprising:
an operating system operable to detect connection of a PCMCIA card to the PCMCIA connector and in response thereto to allocate a legacy interrupt channel for PCMCIA interrupts received through the PCMCIA interrupt pin; and
a device driver including a trap mechanism operable to intercept and identify PCI interrupts received through the PCMCIA interrupt pin and, in response thereto, to call an interrupt service routine using said legacy interrupt channel as an operand.

10. An apparatus according to claim 9, wherein the bridge further comprises a controller that has a storage portion which is addressable by the computer, the operating system and device driver being operable to write and read the legacy interrupt channel allocated to said PCMCIA interrupts to and from the storage portion of the controller.

11. An apparatus according to claim 9, wherein the computer maintains in use an interrupt mapping record, the operating system and device driver being operable to write and read the legacy interrupt channel allocated to said PCMCIA interrupts to and from the interrupt mapping record.

12. An apparatus according to claim 9, wherein the operating system is further operable to detect a PCI-to-PCMCIA bridge on the PCI expansion connector and in response thereto to allocate a further legacy interrupt channel for interrupts originating from the PCI-to-PCMCIA bridge.

13. An apparatus according to claim 12, wherein the trap mechanism is further operable to intercept and identify PCI interrupts originating from the PCI-to-PCMCIA bridge and, in response thereto, to call a further interrupt service routine using said further legacy interrupt channel as an operand.

14. A method of handling an interrupt in a computer system including a PCI expansion connector, the method comprising:
(a) sensing a PCI-to-PCMCIA bridge on the PCI expansion connector;
(b) loading a device driver for the PCI-to-PCMCIA bridge, the device driver including an interrupt service routine for handling PCMCIA interrupts;
(c) allocating a legacy interrupt channel to the PCMCIA interrupts;
(d) detecting a PCMCIA interrupt; and
(e) calling the interrupt service routine using the allocated legacy interrupt channel as an operand.

15. A method according to claim 14, comprising the further steps of:
(f) disabling detection of further PCMCIA interrupts after step (d) and before step (e); and (g) re-enabling detection of further PCMCIA interrupts after step (e).

16. A method according to claim 15, wherein steps (f) and (g) involve a temporary re-allocation of PCMCIA interrupts to a further legacy interrupt channel so that the PCI-to-PCMCIA bridge is temporarily re-configured to prevent PCMCIA interrupts from being routed to the PCI expansion connector.

17. A method according to claim 16, wherein the further legacy interrupt channel is channel zero.

18. A method according to claim 15, wherein, in step (g), re-enabling is made conditional on step (e) servicing the PCMCIA interrupt with the interrupt service routine, wherein re-enabling is deferred by a delay time if the PCMCIA interrupt was not serviced by the interrupt service routine.

19. A method according to claim 18, wherein the delay time is at least one millisecond.

20. A method according to claim 14, further comprising the step of:
   emulating a programmable interrupt controller during step (e) in such a way that the interrupt service routine receives as a data result of any data accesses to the programmable interrupt controller the same data result that would be supplied if the PCMCIA interrupt was routed to the programmable interrupt controller in hardware on the legacy interrupt channel allocated to the PCMCIA interrupt.

21. A method according to claim 20, wherein emulation is effected by loading a trap address range in a processor debug register, wherein the address range is that of status registers of the programmable interrupt controller, together with a start address of a PIC emulation routine, so that during step (e) a data access within said trap address range is intercepted and results in a call of the emulation routine.

22. A method according to claim 21, wherein one of said status registers is an inservice register, the PIC emulation routine acting to set an in-service bit of said data result for read accesses to the in-service register.

23. A device driver for handling interrupts from an external peripheral device in a computer system including a programmable interrupt controller (PIC) connected to receive interrupts on a plurality of legacy interrupt channel connections and including status registers for receiving read and write accesses relating to pending interrupts and returning an access result, the device driver being operable to handle interrupts from an external peripheral device that is connected to a peripheral connector of a computer system and that has an interrupt line that can be allocated a legacy interrupt channel, but is not connected in hardware to one of said legacy interrupt channel connections of the computer system, wherein the device driver includes a PIC emulation routine operable to modify said access result for read accesses to at least one of said status registers so that the access result is returned in a state which it would have if said interrupt line of the external peripheral device were supplied in hardware to the PIC on one of said legacy interrupt channel connections.

24. A device driver according to claim 23, wherein one of said status registers is an in-service register for indicating an active one of any of said pending interrupts and wherein the PIC additionally comprises a command register, the PIC emulation routine acting to set an in-service bit of said access result for read accesses to the in-service register when the previous write access to the command register was a command to access the in-service register.

25. A device driver according to claim 23, wherein the PIC emulation routine is operable to configure a debug register of a processor to trap read and write accesses to addresses within an address range including at least one of said status registers and, on trapping, to call a trap function for controlling interaction of the read and write accesses with the PIC.

26. A PCI-to-PCMCIA bridge comprising:
   a PCI expansion connector including a PCI interrupt pin for transmitting a PCI interrupt;
   a PCMCIA connector for connecting to a PCMCIA card, the PCMCIA connector including a PCMCIA interrupt pin for receiving a PCMCIA interrupt; and
   an interrupt converter arranged to convert a PCMCIA interrupt received at the PCMCIA interrupt pin into a PCI interrupt and to supply the PCI interrupt to the PCI interrupt pin of the PCI expansion connector.

27. A bridge according to claim 26, wherein the interrupt converter comprises:
   a demultiplexer having an input connected to the PCMCIA interrupt pin and a plurality of outputs, the demultiplexer being operable to route a PCMCIA interrupt received at said input to one of said outputs; and
   a combiner wired to all of said demultiplexer outputs and having internal circuitry arranged to route a PCMCIA interrupt received from any one of said demultiplexer outputs to the PCI interrupt pin of the PCI expansion connector.

28. A bridge according to claim 27, wherein said PCI interrupt pin is an INTA# pin.

\* \* \* \* \*